United States Patent
Hongo et al.

(10) Patent No.: US 9,429,127 B2
(45) Date of Patent: Aug. 30, 2016

(54) FUEL INJECTOR

(71) Applicant: DENSO CORPORATION, Kariya, Aichi-pref. (JP)

(72) Inventors: Yusuke Hongo, Kiyosu (JP); Tomoki Fujino, Okazaki (JP); Masaki Takeyama, Okazaki (JP)

(73) Assignee: DENSO CORPORATION, Kariya (JP)

( * ) Notice: Subject to any disclaimer, the term of this patent is extended or adjusted under 35 U.S.C. 154(b) by 97 days.

(21) Appl. No.: 14/027,582

(22) Filed: Sep. 16, 2013

(65) Prior Publication Data

US 2014/0084085 A1 Mar. 27, 2014

(30) Foreign Application Priority Data

Sep. 24, 2012 (JP) ................. 2012-209686

(51) Int. Cl.
| | | |
|---|---|---|
| B05B 1/30 | (2006.01) | |
| B05B 1/34 | (2006.01) | |
| F02M 69/04 | (2006.01) | |
| F02M 21/02 | (2006.01) | |

(52) U.S. Cl.
CPC ......... *F02M 69/04* (2013.01); *F02M 21/0248* (2013.01); *F02M 69/047* (2013.01); *B05B 1/30* (2013.01); *B05B 1/34* (2013.01); *Y02T 10/32* (2013.01)

(58) Field of Classification Search
CPC .................................. B05B 1/30; B05B 1/34
USPC ................. 239/418, 419, 419.5, 428.5, 463, 239/533.14, 533.12, 585.1, 584, 533.2, 239/533.3, 8, 433
See application file for complete search history.

(56) References Cited

U.S. PATENT DOCUMENTS

| | | | | |
|---|---|---|---|---|
| 4,982,716 A | * | 1/1991 | Takeda | .................... F02M 69/08 |
| | | | | 123/470 |
| 5,035,358 A | * | 7/1991 | Katsuno | ............... F02M 69/047 |
| | | | | 239/403 |
| 5,615,836 A | * | 4/1997 | Graef | ........................ 239/428.5 |

(Continued)

FOREIGN PATENT DOCUMENTS

| | | |
|---|---|---|
| DE | 102004048603 | 4/2006 |
| DE | 102005046434 | 3/2007 |

(Continued)

OTHER PUBLICATIONS

Office Action (2 pages) dated Sep. 2, 2014, issued in corresponding Japanese Application No. 2012-209686 and English translation (2 pages).

(Continued)

*Primary Examiner* — Arthur O Hall
*Assistant Examiner* — Christopher R Dandridge
(74) *Attorney, Agent, or Firm* — Nixon & Vanderhye P.C.

(57) ABSTRACT

A fuel injector which injects a gaseous fuel includes a nozzle and a housing. The nozzle has an outlet which injects the gaseous fuel at a flow rate greater than or equal to a predetermined rate. The housing has a mixing chamber which communicates with the outlet. The housing further has an air introducing passage which introduces an outer air into the mixing chamber and an injection hole which injects an air-mixed fuel formed by mixing the gaseous fuel with the outer air. Thus, a mixing of the gaseous fuel and the outer air can be improved, and the gaseous fuel can be efficiently combusted.

28 Claims, 5 Drawing Sheets

(56) References Cited

U.S. PATENT DOCUMENTS

| | | | |
|---|---|---|---|
| 5,707,012 A | | 1/1998 | Maier et al. |
| 5,772,122 A | * | 6/1998 | Sugiura ................ F02M 69/047 239/408 |
| 5,904,299 A | * | 5/1999 | Hans ...................... F02M 43/04 239/408 |
| 6,010,077 A | * | 1/2000 | Casey ............................... 239/8 |
| 6,029,913 A | * | 2/2000 | Stroia et al. ............. 239/533.12 |
| 6,095,437 A | * | 8/2000 | Nozawa ................... F02D 7/02 239/407 |
| 6,336,621 B1 | | 1/2002 | Il et al. |
| 6,575,382 B1 | * | 6/2003 | Fischer et al. .................... 239/5 |
| 2003/0111562 A1 | * | 6/2003 | Stier et al. ................. 239/585.1 |
| 2003/0132323 A1 | * | 7/2003 | Ismailov ........... F02M 51/0678 123/299 |
| 2008/0048055 A1 | * | 2/2008 | Micheli ........................ 239/463 |
| 2010/0192906 A1 | | 8/2010 | Johnson |
| 2013/0043330 A1 | * | 2/2013 | Corless ................ F02M 69/047 239/418 |

FOREIGN PATENT DOCUMENTS

| | | |
|---|---|---|
| DE | 102006040649 | 3/2008 |
| JP | 59-043963 | 3/1984 |
| JP | 11-303685 | 11/1999 |
| JP | 2000-248995 | 9/2000 |
| JP | 2001-059468 | 3/2001 |
| JP | 2002-054532 | 2/2002 |
| WO | WO 2007/036382 | 4/2007 |

OTHER PUBLICATIONS

Office Action (2 pages) dated Jun. 2, 2015, issued in corresponding Japanese Application No. 2012-209686 and English translation (2 pages).

* cited by examiner

FUEL INJECTOR

CROSS-REFERENCE TO RELATED APPLICATION

This application is based on Japanese Patent Application No. 2012-209686 filed on Sep. 24, 2012, the disclosure of which is incorporated herein by reference.

TECHNICAL FIELD

The present disclosure relates to a fuel injector which injects gaseous fuel.

BACKGROUND

It is well known that a liquid fuel such as gasoline or light oil is used as a fuel to be combusted in an internal combustion engine. However, a gaseous fuel such as methane is also used as the fuel. JP-2000-240525A discloses a fuel injector for gaseous fuel. In this case, a mixture gas of the gaseous fuel injected by the fuel injector and an intake air flowing through an intake pipe is ignited and combusted in a combustion chamber.

However, the gaseous fuel is harder to mix with air than the liquid fuel.

SUMMARY

The present disclosure is made in view of the above matters, and it is an object of the present disclosure to provide a fuel injector which can advance the gaseous fuel to be efficiently combusted.

A fuel injector for injecting a gaseous fuel includes a nozzle and a housing. The nozzle has an outlet which injects the gaseous fuel at a flow rate greater than or equal to a predetermined rate. The housing has a mixing chamber which communicates with the outlet. Further, the housing has at least one air introducing passage which introduces an outer air into the mixing chamber and an injection hole which injects an air-mixed fuel formed by mixing the gaseous fuel with the outer air.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, a fuel injector according to embodiments of the present disclosure will be described with reference to drawings. In addition, in each following embodiment, the same parts and components as those in a first embodiment are indicated with the same reference numerals and the same descriptions will not be reiterated.

(First Embodiment)

Figure 1:
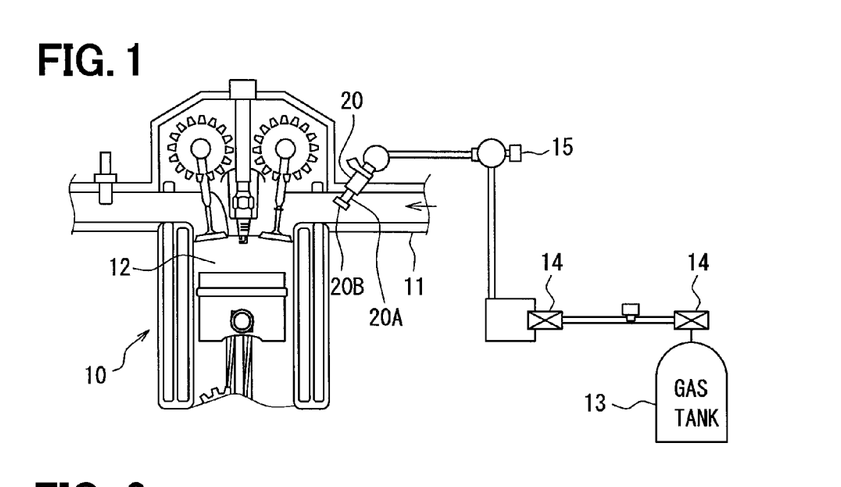
FIG. 1 is a diagram showing an outline of attaching a fuel injector according to a first embodiment of the present disclosure.

As shown in FIG. 1, an internal combustion engine 10 is an engine of intake port injection in which a fuel is injected into an intake passage of an intake pipe 11. The fuel injector 20 disposed in the intake pipe 11 injects an air-mixed fuel into the intake pipe 11. In this case, the air-mixed fuel is a gaseous fuel mixed with an outer air. The air-mixed fuel is mixed with an intake air flowing through the intake pipe 11 to form a mixed gas. The mixed gas flows into a combustion chamber 12, pressurized and ignited.

For example, the gaseous fuel may be compressed natural gas (CNG), liquefied natural gas (LNG), or hydrogen. The gaseous fuel supplied to the fuel injector 20 is compressed and accommodated in a gas tank 13 mounted on vehicle.

When an electromagnetic valve 14 is opened, a pressure of the gaseous fuel is regulated to a predetermined pressure by a regulation valve 14. Then, the gaseous fuel is supplied to the fuel injector 20.

The fuel injector 20 includes a body portion 20A and a mixing portion 20B. The body portion 20A injects the gaseous fuel in a case where a flow rate of the gaseous fuel is greater than or equal to a predetermined rate. The mixing portion 20B introduces the outer air into the fuel injector 20, mixes the outer air with the gaseous fuel to form the air-mixed fuel, and injects the air-mixed fuel into the intake pipe 11. As shown in FIG. 1, a part of the intake air is introduced into the fuel injector 20 as the outer air.

Figure 2:
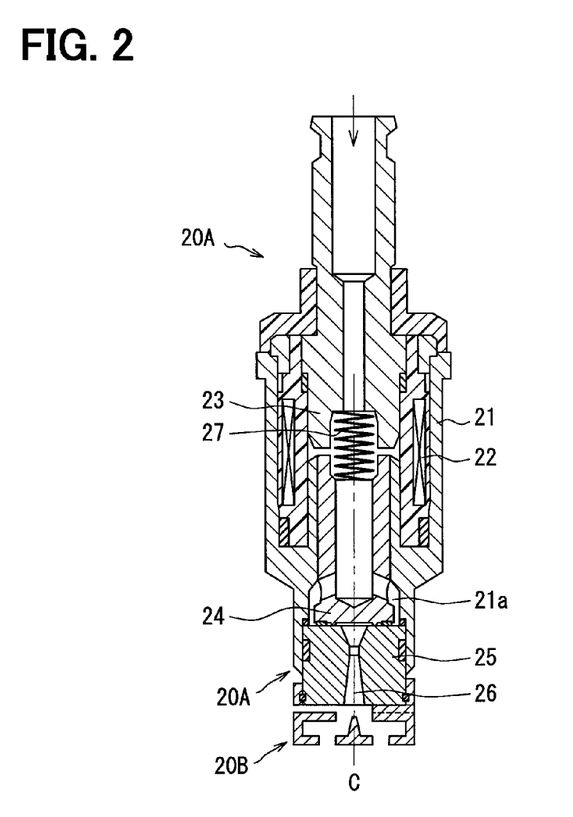
FIG. 2 is a sectional view showing the fuel injector according to the first embodiment.

FIG. 2 is a sectional view showing a configuration of the fuel injector 20. The body portion 20A includes a body 21, an electromagnetic coil 22, a stator core 23, a valve body 24, a nozzle 25 and an elastic member 27. The body 21 which is tube-shaped holds the electromagnetic coil 22, the stator core 23, the valve body 24 and the nozzle 25. The body 21, the stator core 23, the valve body 24 and the nozzle 25 are made of metal. As shown in FIG. 2, a dotted-dashed line C represents an axial center of the body 21. The valve body 24 has a concentric axis with the body 21.

The body 21 is provided with a flow passage 21a through which the gaseous fuel is supplied from the gas tank 13. The nozzle 25 is provided with an injection passage 26 which communicates with the flow passage 21a. The valve body 24 is capable to switch to an open state or a close state. In the open state, the valve body 24 makes a communication between the flow passage 21a and the injection passage 26. In the close state, the valve body 24 blocks the communication.

Specifically, the valve body 24 is provided with a seal portion 24a which is ring-shaped and an elastic seal member 24b which is elastically deformable. The nozzle 25 includes a seat surface 25a opposite to the elastic seal member 24b and the seal portion 24a.

When the electromagnetic coil 22 is energized to generate an electromagnetic force, the valve body 24 is suctioned by the stator core 23 and moved toward a separate direction so that the valve body 24 is moved to be far away from the injection passage 26. Thus, the elastic seal member 24b and the seal portion 24a are detached from the seat surface 25a. That is, the valve body 24 is at the open state, and the gaseous fuel is injected from the injection passage 26. When the electromagnetic coil 22 is deenergized, the valve body 24 is moved by an elastic force of the elastic member 27 toward an approach direction so that the valve body 24 is moved to be close to the injection passage 26. Thus, the elastic seal member 24b and the seal portion 24a are seated on the seat surface 25a. That is, the valve body 24 is at the close state, and the gaseous fuel is stopped from being injected from the injection passage 26.

Hereafter, a configuration of the nozzle 25 will be described with reference to FIG. 3.

When the valve body 24 is opened, the gaseous fuel flows through an inlet 261 of the injection passage 26, the flow rate of the gaseous fuel is increased, and the gaseous fuel is injected from an outlet 262. The injection passage 26 includes a pressurization portion 26a, an intermediate portion 26b and a downstream portion 26c. A sectional area of the pressurization portion 26a in a flowing direction of the gaseous fuel becomes smaller and smaller from the inlet 261 toward the outlet 262. A sectional area of the intermediate portion 26b in the flowing direction of the gaseous fuel is a constant value. A sectional area of the downstream portion 26c in the flowing direction of the gaseous fuel becomes greater and greater from the intermediate portion 26b to the outlet 262.

According to the above configuration, the flow rate of the gaseous fuel is increased to a value greater than or equal to the predetermined rate by the injection passage 26, and the gaseous fuel is injected from the outlet 262. According to the present embodiment, the predetermined rate may be the speed of sound. The nozzle 25 is functioned as a De Laval nozzle.

The mixing portion 20B includes a housing 30 and a cone member 34. The housing 30 forms a mixing chamber 31 which communicates with the injection passage 26 via the outlet 262. The cone member 34 is disposed in the mixing chamber 31. The mixing chamber 31 has an inlet chamber 31a and an enlarging chamber 31b. The inlet chamber 31a receives the gaseous fuel injected from the outlet 262. The enlarging chamber 31b is positioned downstream of the inlet chamber 31a. The inlet chamber 31a and the enlarging chamber 31b are cylinder-shaped, and the mixing chamber 31 has a concentric axis with the body 21. A sectional area of the inlet chamber 31a is greater than a sectional area of the outlet 262, in the flowing direction of the gaseous fuel. Further, a sectional area of the enlarging chamber 31b is greater than the sectional area of the inlet chamber 31a, in the flowing direction of the gaseous fuel.

The housing 30 further defines an air introducing passage 32 to introduce the outer air into the fuel injector 20. The air introducing passage 32 has an inlet portion 32a which communicates with the intake passage of the intake pipe 11, and an outlet portion 32b which communicates with the inlet chamber 31a. A part of the intake air used as the outer air is introduced from the inlet portion 32a to the mixing chamber 31 via the outlet portion 32b. As shown in FIG. 3, the outlet portion 32b is placed at a position uppermost stream of the inlet chamber 31a.

When the gaseous fuel is injected from the outlet 262 at a flow rate greater than or equal to the speed of sound, a negative pressure is generated around the outlet 262 in the inlet chamber 31a. The outer air is suctioned from the air introducing passage 32 into the inlet chamber 31a by the negative pressure. The cone member 34 has a top portion 34a placed at a position downstream of the outlet portion 32b. The outer air suctioned by the negative pressure is mixed with the gaseous fuel to form the air-mixed fuel in the mixing chamber 31. The housing 30 further has an injection hole 33 provided in a bottom surface of the housing 30. The air-mixed fuel is injected from the injection hole 33.

Figure 3:
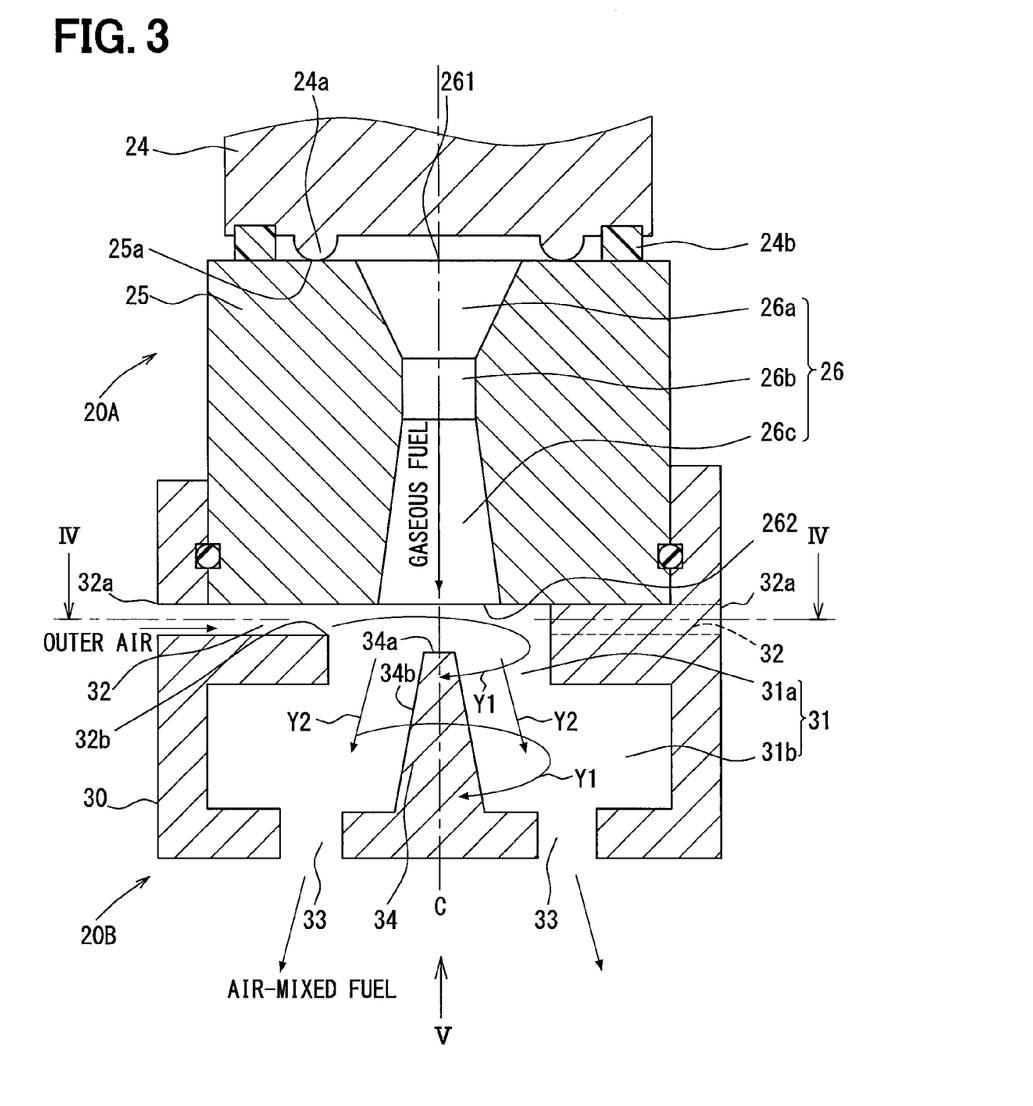
FIG. 3 is an enlarged view showing a part of FIG. 2.

As shown in FIG. 3, the outlet portion 32b is placed on a circumference surface of the inlet chamber 31a. The outer air spirally flows along a side surface 34b of the cone member 34 as a first arrow Y1 shown in FIG. 3. According to the present disclosure, the first arrow Y1 represents a spiraling direction of the gaseous fuel. The gaseous fuel flows outward in a radial direction as a second arrow Y2 shown in FIG. 3. Since the cone member 34 improves the outer air to flow spirally and improves the gaseous fuel to flow outward in the radial direction, the cone member 34 improves to mix the outer air with the gaseous fuel.

Figure 4:
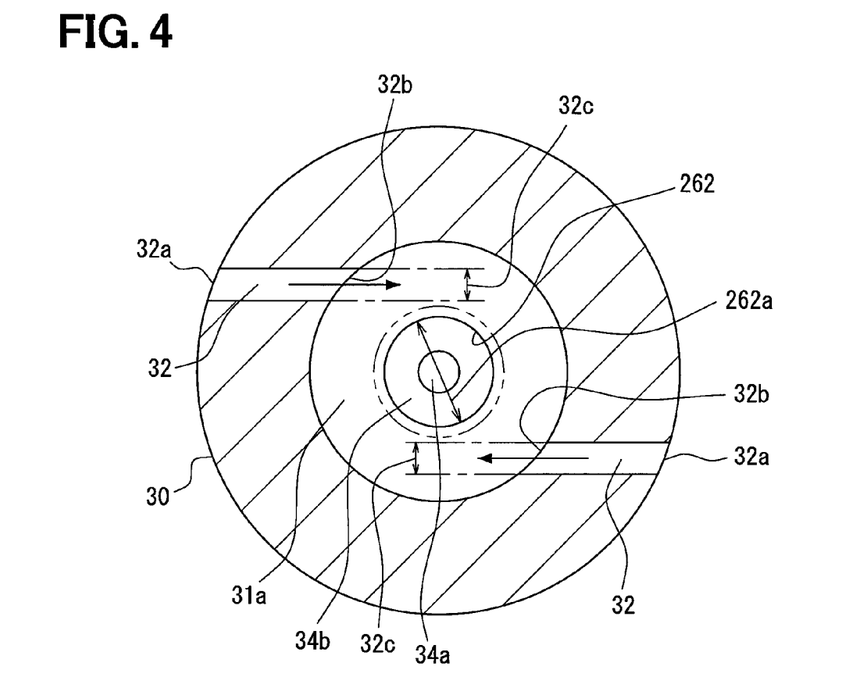
FIG. 4 is a sectional view taken along a line IV-IV in FIG. 3.
Figure 5:
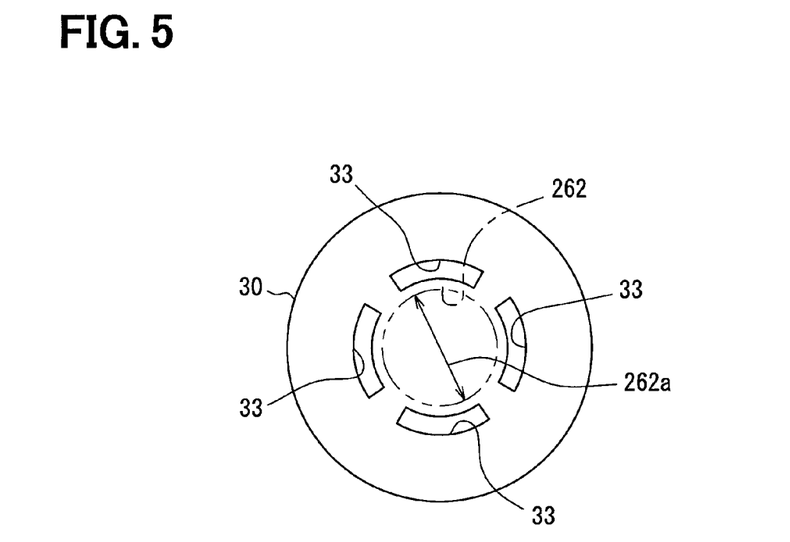
FIG. 5 is a side view viewed along an arrow V in FIG. 3.

FIG. 4 is a sectional view taken along a line IV-IV in FIG. 3, and FIG. 5 is a graph viewed along an arrow V in FIG. 3. As shown in FIGS. 4 and 5, a sectional area of the outlet 262 in the flowing direction of the gaseous fuel is referred to as an injection area 262a. As shown in FIG. 4, a sectional area of the air introducing passage 32 is referred to as an outlet area 32c.

As shown in FIG. 4, the air introducing passage 32 is provided so that the outer air is introduced to an area where the outer air is not directly collided with the gaseous fuel injected from the injection area 262a. Specifically, the air introducing passage 32 is provided so that the outlet area 32c is positioned at an exterior of the injection area 262a.

According to the present embodiment, a plurality of air introducing passages 32 are disposed in the housing 30 so that spiraling directions of the outer air introduced by the air introducing passages 32 are identical with each other. Further, the air introducing passages 32 are provided so that the outer air flows along a straight line tangent to the injection area 262a.

As shown in FIG. 5, a plurality of injection holes 33 are provided in the cone member 34 so that the injection holes 33 are placed in line along a periphery of an axial center of the cone member 34. The injection holes 33 are arc-shaped so that a length in the periphery of the axial center of the cone member 34 is greater than a length in a radial direction of the cone member 34. Further, the injection holes 33 are positioned at an exterior of the outlet area 32c.

According to the present embodiment, the mixing chamber 31 is placed at a position downstream of the injection passage 26 which injects the gaseous fuel at a flow rate greater than or equal to the speed of sound. Further, each air introducing passage 32 introducing the outer air and each injection hole 33 injecting the air-mixed fuel are provided in the housing 30.

Therefore, the outer air is introduced into the fuel injector 20 via the air introducing passage 32, and the fuel injector 20 injects the gaseous fuel mixed with the outer air. Since the outer air and the gaseous fuel are mixed with each other in the mixing chamber 31 which has a smaller capacity than the intake pipe 11 and is placed at a position close to the outlet 262, a mixing of the gaseous fuel and the outer air can be improved. Thus, the gaseous fuel can be efficiently combusted.

Hereafter, features of the present embodiment will be described.

(1) As shown in FIG. 3, the mixing chamber 31 has the inlet chamber 31a and the enlarging chamber 31b. The inlet chamber 31a receives the gaseous fuel injected from the outlet 262. The enlarging chamber 31b enlarges a flow sectional area of the gaseous fuel at a position downstream of the inlet chamber 31a. Further, the outlet portion 32b of each air introducing passage 32 is disposed in the inlet chamber 31a.

Thus, the mixing of the gaseous fuel and the outer air can be improved in the enlarging chamber 31b.

The negative pressure is generated around the outlet 262 in the mixing chamber 31 by the gaseous fuel at the flow rate greater than or equal to the predetermined rate. Further, the negative pressure becomes greater as a position of generating the negative pressure becomes closer to the outlet 262. Therefore, the outer air introduced into the inlet chamber 31a is suctioned into the mixing chamber 31 by the negative pressure greater than the negative pressure by which the outer air introduced into the enlarging chamber 31b is suctioned into the mixing chamber 31. Thus, a flow amount of the outer air can be increased, and the mixing of the gaseous fuel and the outer air can be advanced.

Since a flow sectional area of the inlet chamber 31a is less than that of the enlarging chamber 31b, a reduction of the flow rate of the gaseous fuel in the inlet chamber 31a is constricted. Therefore, the negative pressure generated in the inlet chamber 31a can be increased, and the flow amount of the outer air can be further increased.

(2) As shown in FIG. 5, the injection holes 33 are positioned at the exterior of the injection area 262a.

The gaseous fuel injected from the injection passage 26 is sprayed and expanded in the enlarging chamber 31b in a radial direction of the injection passage 26. Since the injection holes 33 are positioned at the exterior of the injection area 262a, the flow rate of the air-mixed fuel is difficult to be decreased when the air-mixed fuel is injected from the injection holes 33. Therefore, the air-mixed fuel is vigorously injected into the intake pipe 11. In this case, a mixing of the air-mixed fuel and the intake air after the air-mixed fuel is injected from the fuel injector 20 can be advanced. As a result, the gaseous fuel can be efficiently combusted.

(3) As shown in FIG. 3, the housing 30 is configured so that the outer air spirally flows along the side surface 34b and is introduced to the injection holes 33. Since the outer air spirally flows in the mixing chamber 31b, the mixing of the gaseous fuel and the outer air can be advanced in the mixing chamber 31b.

(4) As shown in FIG. 4, each air introducing passage 32 is provided so that the outer air is introduced to a position shifted by a predetermined amount from an axial center of the nozzle 25. Therefore, the outer air can be advanced to spirally flow around the axial center of the nozzle 25, and the mixing of the gaseous fuel and the outer air can be advanced.

(5) According to the present embodiment, a plurality of air introducing passages 32 are provided in the housing 30 so that spiraling directions of the outer air introduced by the air introducing passages 32 are identical with each other. As shown in FIG. 4, all of the spiraling directions are directions along clockwise rotation. Therefore, the outer air can be further advanced to spirally flow around the axial center of the nozzle 25.

(6) As shown in FIG. 4, each air introducing passage 32 is provided so that the outer air is introduced to the area where the outer air is not directly collided with the gaseous fuel injected from the injection area 262a. Further, the negative pressure generated around the injection area 262a is greater than the negative pressure generated in the injection area 262a. Thus, the flow amount of the outer air can be increased, and the mixing of the gaseous fuel and the outer air can be advanced.

(7) As shown in FIG. 3, the cone member 34 is cone-shaped along the axial center of the nozzle 25 so that a diameter of a sectional area of the cone member 34 increases in the flowing direction of the gaseous fuel. Since the outer air flows along the side surface 34b, the outer air is advanced to spirally flow in the mixing chamber 31. Therefore, the mixing of the outer air and the gaseous fuel in the mixing chamber 31 can be advanced.

(8) As shown in FIG. 3, the cone member 34 is placed at a position downstream of the outlet portion 32b. In a case where the cone member 34 is placed at a position in the vicinity of the outlet 262 to be opposite with the outlet portion 32b, the negative pressure is lowered by the cone member 34. According to the present embodiment, since the cone member 34 is placed at a position downstream of the outlet portion 32b, a reduction of the negative pressure due to the cone member 34 can be restricted. Therefore, the flow amount of the outer air can be increased, and the mixing of the gaseous fuel and the outer air can be advanced.

(Second Embodiment)

Figure 6:
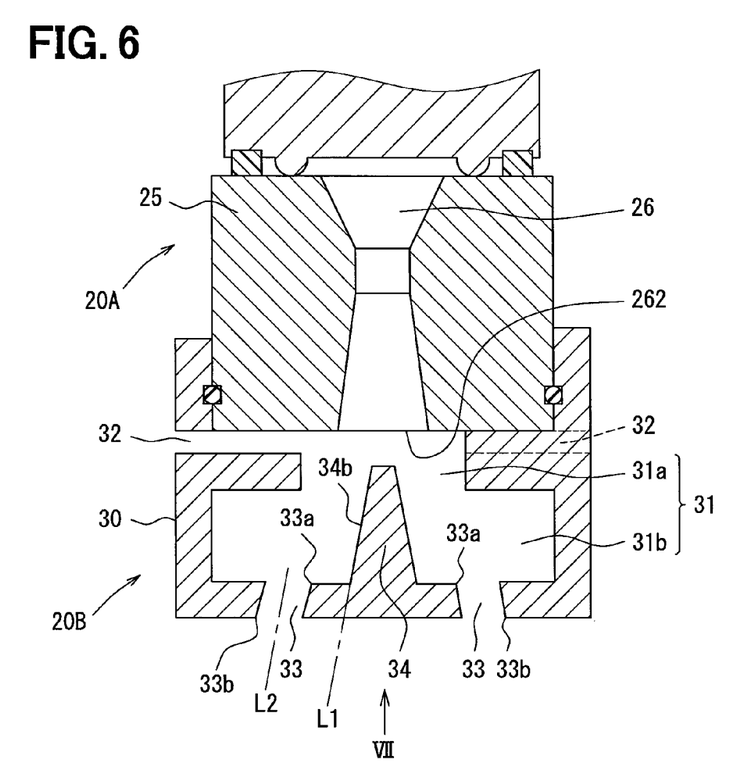
FIG. 6 is a sectional view showing the fuel injector according to a second embodiment.

In a second embodiment, the same parts and components as those in the first embodiment are indicated with the same reference numerals and the same descriptions will not be reiterated. As shown in FIG. 3, each injection hole 33 according to the first embodiment is provided to penetrate through the bottom surface of the housing 30 in a direction parallel to the axial center of the cone member 34. However, as shown in FIG. 6, each injection hole 33 according to the second embodiment is provided to penetrate through the bottom surface of the housing 30 in a direction parallel to a ridge line L1 of the cone member 34. That is, each injection hole 33 is provided to penetrate through the bottom surface of the housing 30 so that a center line L2 of the injection hole 33 is parallel to the ridge line L1.

Figure 7A:
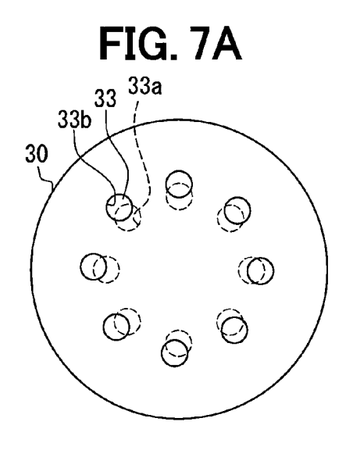
FIG. 7A is a side view showing an example of the fuel injector viewed along an arrow VII in FIG. 6.

FIG. 7A is a graph showing an example of the fuel injector 20 viewed along an arrow VII in FIG. 6. According to the present embodiment, each injection hole 33 is circularly shaped.

Further, each injection hole 33 has an inlet port 33a and an outlet port 33b. A line from a center of the inlet port 33a to a center of the outlet port 33b is inclined with respect to the axial center of the nozzle 25. Besides, the line from a center of the inlet port 33a to a center of the outlet port 33b overlaps a part of the center line L2.

According to the present embodiment, each injection hole 33 is provided to extend in a direction parallel to the ridge line L1. When the air-mixed fuel flowing along the side surface 34b is injected from the injection holes 33, an attenuation of a component of velocity of the air-mixed fuel in the direction parallel to the ridge line L1 can be restricted. Therefore, the air-mixed fuel is vigorously injected into the intake pipe 11. In this case, the mixing of the air-mixed fuel and the intake air after the air-mixed fuel is injected from the fuel injector 20 can be advanced. As a result, the gaseous fuel can be efficiently combusted.

(Modification of Second Embodiment)

Figure 7B:
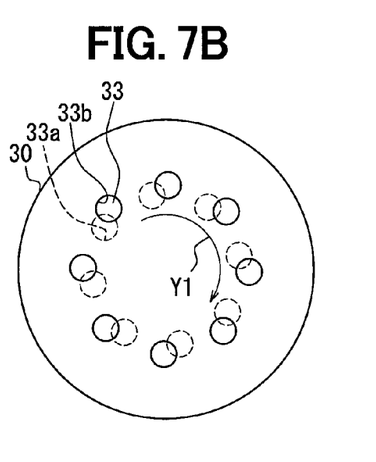
FIG. 7B is a side view showing another example of the fuel injector viewed along the arrow VII in FIG. 6.

FIG. 7B is a graph showing another example of the fuel injector 20 viewed along the arrow VII in FIG. 6. The center of the outlet port 33b is placed at a position downstream of the center of the inlet port 33a along the first arrow Y1.

When the air-mixed fuel spirally flowing in the mixing chamber 31 is injected from the injection holes 33, an attenuation of a component of velocity of the air-mixed fuel in a direction parallel to the first arrow Y1 can be restricted. Therefore, the air-mixed fuel is vigorously injected into the intake pipe 11. In this case, the mixing of the air-mixed fuel and the intake air after the air-mixed fuel is injected from the fuel injector 20 can be advanced. As a result, the gaseous fuel can be efficiently combusted.

(Third Embodiment)

Figure 8:
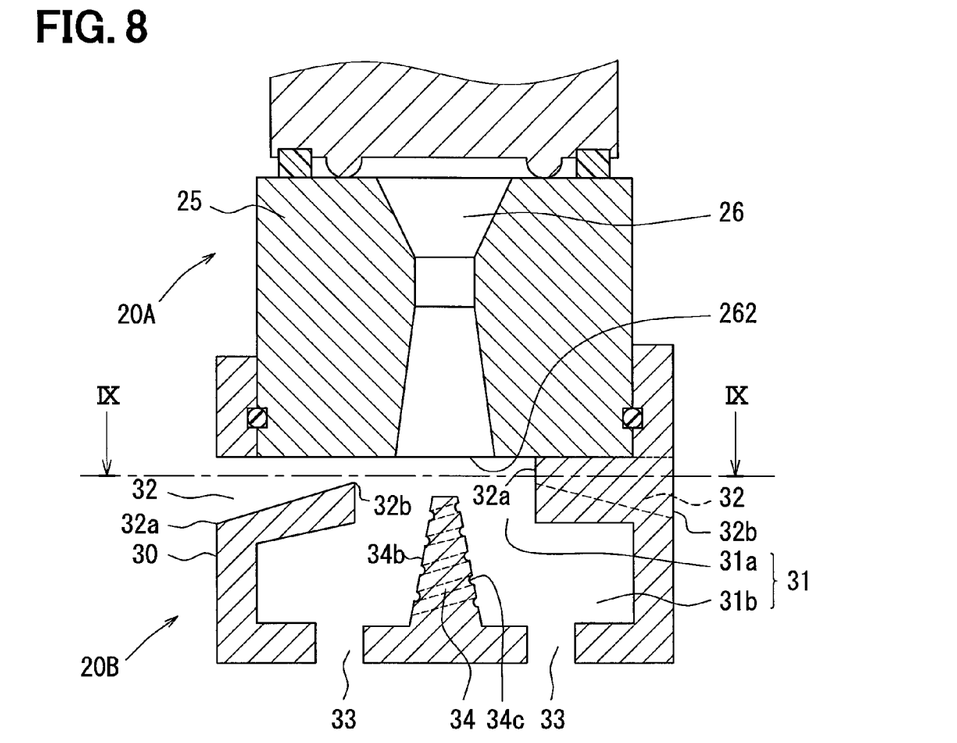
FIG. 8 is a sectional view showing the fuel injector according to a third embodiment.
Figure 9:
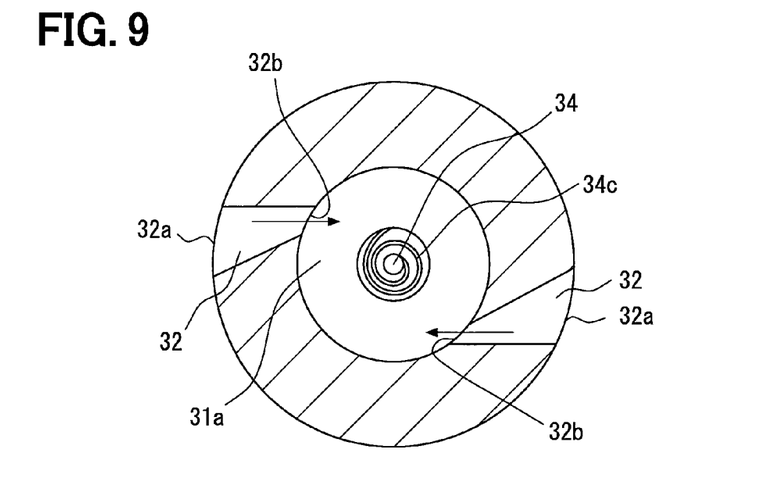
FIG. 9 is a sectional view taken along a line IX-IX in FIG. 8.

In a third embodiment, the same parts and components as those in the first and second embodiments are indicated with the same reference numerals and the same descriptions will not be reiterated. As shown in FIG. 3, each air introducing passage 32 according to the first embodiment is configured so that a flow sectional area of the inlet portion 32a is equal to a flow sectional area of the outlet portion 32b. However, according to the third embodiment, as shown in FIGS. 8 and 9, the flow sectional area of the inlet portion 32a is greater than a flow sectional area of the outlet portion 32b. Specifically, as shown in FIGS. 8 and 9, each air introducing passage 32 is shaped so that a flow sectional area of the air introducing passage 32 decreases in a flowing direction of the outer air.

It is preferable that the mixing is advanced by raising a spiral rate of the outer air in the mixing chamber 31. Thus, it is necessary to make the flow sectional area of the outlet portion 32b as small as possible. However, in a case where the flow sectional area of the inlet portion 32a is equal to the flow sectional area of the outlet portion 32b, a pressure loss generated in the air introducing passage 32 is increased in accordance with a decrease in the flow sectional area of the inlet portion 32a. According to the present embodiment, since the flow sectional area of the inlet portion 32a is greater than the flow sectional area of the outlet portion 32b, the spiral rate of the outer air can be raised by decreasing the flow sectional area of the outlet portion 32b, and the pressure loss can be restricted.

Further, a spiral groove 34c is provided on the side surface 34b to extend in the flowing direction of the gaseous fuel. Since the outer air flows along the side surface 34b, the outer air is advanced to spirally flow by the spiral groove 34c. Therefore, the mixing of the outer air and the gaseous fuel in the mixing chamber 31 can be advanced.

(Other Embodiment)

The present disclosure is not limited to the embodiments described above, but may be performed, for example, in the following manner. Further, the characteristic configuration of each embodiment can be combined.

(1) According to the above embodiments, the fuel injector 20 is disposed in the intake pipe 11. However, the fuel injector 20 may be disposed in a member such as cylinder head to directly inject fuel into the combustion chamber 12.

(2) According to the above embodiments, a part of the intake air in the intake pipe 11 is used as the outer air to introduce into the mixing chamber 31. However, an air outside of the intake pipe 11 may be used as the outer air to introduce into the mixing chamber 31. According to a configuration shown in FIG. 1, even when the gaseous fuel is leaked from the inlet portion 32a of the air introducing passage 32, the gaseous fuel is leaked to an interior of the intake pipe 11 rather than an exterior of the intake pipe 11. Therefore, it can be avoided that the gaseous fuel is leaked to the exterior of the intake pipe 11 via the air introducing passage 32.

What is claimed is:

1. A fuel injector for injecting a gaseous fuel, comprising:
    a nozzle having an outlet which injects the gaseous fuel at a flow rate greater than or equal to a predetermined rate; and
    a housing having a mixing chamber which communicates with the outlet, wherein the housing further has at least one air introducing passage which introduces an outer air into the mixing chamber and an injection hole which injects an air-mixed fuel formed by mixing the gaseous fuel with the outer air
    the air introducing passage has an inlet portion and an outlet portion, the inlet portion of the air introducing passage is opened on an outer wall of the housing, the outlet portion of the air introducing passage is opened to an interior of the housing, and
    a flow sectional area of the air introducing passage continuously decreases in a flowing direction of the outer air through the air introducing passage such that a flow sectional area of the inlet portion that is opened on the interior of the housing is greater than a flow sectional area of the outlet portion that is opened to an interior of the housing,
    wherein the housing is configured to make the outer air spirally flow in the mixing chamber and be introduced to the injection hole,
    the mixing chamber is provided with a cone member which is cone-shaped along an axial center of the nozzle so that a diameter of a sectional area of the cone member increases in the flowing direction,
    the cone member has a side surface and a spiral groove, and the spiral groove is provided on the side surface to extend in the flowing direction, and
    the air introducing passage is provided so that the outer air is directed to a position shifted by a predetermined amount from an axial center of the nozzle.

2. A fuel injector according to claim 1, wherein
    the mixing chamber has an inlet chamber which receives the gaseous fuel injected from the outlet and an enlarging chamber which enlarges a flow sectional area of the gaseous fuel at a position downstream of the inlet chamber, and
    the air introducing passage has an outlet portion which is provided in the inlet chamber.

3. A fuel injector according to claim 1, wherein
    a sectional area of the outlet is defined as an injection area in a flowing direction of the gaseous fuel, and
    the injection hole is positioned at an exterior of the injection area.

4. A fuel injector according to claim 1, wherein
    a plurality of the air introducing passages is provided in the housing, and
    the air introducing passages are provided so that spiraling directions of the outer air introduced by the air introducing passages are identical with each other.

5. A fuel injector according to claim 1, wherein
    a sectional area of the outlet is defined as an injection area in a flowing direction of the gaseous fuel, and
    each air introducing passage is provided so that the outer air is introduced to the area where the outer air is not directly collided with the gaseous fuel injected from the injection area.

6. A fuel injector according to claim 1, wherein
the mixing chamber is provided with a cone member which is cone-shaped along the axial center of the nozzle so that a diameter of a sectional area of the cone member increases in the flowing direction.

7. A fuel injector according to claim 6, wherein the cone member is placed at a position downstream of the outlet portion.

8. A fuel injector according to claim 1, wherein
the air introducing passage is provided such that the outer air is introduced to a position outside of the injection area in a direction parallel to a tangent line of the injection area.

9. A fuel injector according to claim 1, wherein
the injection hole has an inlet port and an outlet port, and
a center of the outlet port is placed at a position downstream of a center of the inlet port in a spiraling direction of the gaseous fuel.

10. A fuel injector for injecting a gaseous fuel comprising:
a nozzle having an outlet which injects the gaseous fuel at a flow rate greater than or equal to a predetermined rate; and
a housing having a mixing chamber which communicates with the outlet, wherein
the housing further has at least one air introducing passage which introduces an outer air into the mixing chamber and an injection hole which injects an air-mixed fuel formed by mixing the gaseous fuel with the outer air,
the housing is configured to make the outer air spirally flow in the mixing chamber and be introduced to the injection hole,
the mixing chamber is provided with a cone member which is cone-shaped along an axial center of the nozzle so that a diameter of a sectional area of the cone member increases in the flowing direction,
the injection hole is provided to extend in a direction parallel to a ridge line of the cone member,
the injection hole has two side-wall lines in a cross-sectional plane including the axial center, and
the side-wall lines are separated from the ridge line of the cone member, and
the air introducing passage is provided so that the outer air is directed to a position shifted by a predetermined amount from an axial center of the nozzle
wherein the cone member has a side surface and a spiral groove, and the spiral groove is provided on the side surface to extend in the flowing direction.

11. A fuel injector according to claim 10, wherein
the mixing chamber has an inlet chamber which receives the gaseous fuel injected from the outlet and an enlarging chamber which enlarges a flow sectional area of the gaseous fuel at a position downstream of the inlet chamber, and
the air introducing passage has an outlet portion which is provided in the inlet chamber.

12. A fuel injector according to claim 10, wherein
a sectional area of the outlet is defined as an injection area in a flowing direction of the gaseous fuel, and
the injection hole is positioned at an exterior of the injection area.

13. A fuel injector according to claim 10, wherein
a plurality of the air introducing passages is provided in the housing, and
the air introducing passages are provided so that spiraling directions of the outer air introduced by the air introducing passages are identical with each other.

14. A fuel injector according to claim 10, wherein
a sectional area of the outlet is defined as an injection area in a flowing direction of the gaseous fuel, and
each air introducing passage is provided so that the outer air is introduced to the area where the outer air is not directly collided with the gaseous fuel injected from the injection area.

15. A fuel injector according to claim 10, wherein
the cone member is placed at a position downstream of the outlet portion.

16. A fuel injector according to claim 10, wherein
the air introducing passage is provided such that the outer air is introduced to a position outside of the injection area in a direction parallel to a tangent line of the injection area.

17. A fuel injector according to claim 10, wherein
the injection hole has an inlet port and an outlet port, and
a center of the outlet port is placed at a position downstream of a center of the inlet port in a spiraling direction of the gaseous fuel.

18. A fuel injector for injecting a gaseous fuel, comprising:
a nozzle having an outlet which injects the gaseous fuel at a flow rate greater than or equal to a predetermined rate; and
a housing having a mixing chamber which communicates with the outlet, wherein
the housing further has at least one air introducing passage which introduces an outer air into the mixing chamber and an injection hole which injects an air-mixed fuel formed by mixing the gaseous fuel with the outer air,
the housing is configured to make the outer air spirally flow in the mixing chamber and be introduced to the injection hole,
the mixing chamber is provided with a cone member which is cone-shaped along an axial center of the nozzle so that a diameter of a sectional area of the cone member increases in the flowing direction,
the cone member has a side surface and a spiral groove, and the spiral groove is provided on the side surface to extend in the flowing direction, and
the air introducing passage is provided so that the outer air is introduced to a position shifted by a predetermined amount from the axial center of the nozzle.

19. A fuel injector according to claim 18, wherein
the mixing chamber has an inlet chamber which receives the gaseous fuel injected from the outlet and an enlarging chamber which enlarges a flow sectional area of the gaseous fuel at a position downstream of the inlet chamber, and
the air introducing passage has an outlet portion which is provided in the inlet chamber.

20. A fuel injector according to claim 18, wherein
a sectional area of the outlet is defined as an injection area in a flowing direction of the gaseous fuel, and
the injection hole is positioned at an exterior of the injection area.

21. A fuel injector according to claim 18, wherein
a plurality of the air introducing passages is provided in the housing, and
the air introducing passages are provided so that spiraling directions of the outer air introduced by the air introducing passages are identical with each other.

22. A fuel injector according to claim 18, wherein
a sectional area of the outlet is defined as an injection area in a flowing direction of the gaseous fuel, and each air introducing passage is provided so that the outer air is introduced to the area where the outer air is not directly collided with the gaseous fuel injected from the injection area.

23. A fuel injector according to claim 18, wherein the cone member is placed at a position downstream of the outlet portion.

24. A fuel injector according to claim 18, wherein the air introducing passage is provided such that the outer air is introduced to a position outside of the injection area in a direction parallel to a tangent line of the injection area.

25. A fuel injector according to claim 18, wherein the injection hole has an inlet port and an outlet port, and a center of the outlet port is placed at a position downstream of a center of the inlet port in a spiraling direction of the gaseous fuel.

26. A fuel injector according to claim 1, wherein the air introducing passage is tapered between the inlet portion of the air introducing passage that is opened on an outer wall of the housing and the outlet portion of the air introducing passage is opened to an interior of the housing.

27. A fuel injector according to claim 10, wherein
the air introducing passage has an inlet portion,
the air introducing passage has an outlet portion,
the inlet portion of the air introducing passage is opened on an outer wall of the housing,
the outlet portion of the air introducing passage is opened to an interior of the housing,
the air introducing passage is tapered between the inlet portion of the air introducing passage that is opened on an outer wall of the housing and the outlet portion of the air introducing passage is opened to an interior of the housing,
and
a flow sectional area of the air introducing passage continuously decreases in a flowing direction of the outer air through the air introducing passage such that a flow sectional area of the inlet portion that is opened on the interior of the housing is greater than a flow sectional area of the outlet portion that is opened to an interior of the housing.

28. A fuel injector according to claim 18, wherein
the air introducing passage has an inlet portion,
the air introducing passage has an outlet portion,
the inlet portion of the air introducing passage is opened on an outer wall of the housing,
the outlet portion of the air introducing passage is opened to an interior of the housing,
the air introducing passage is tapered between the inlet portion of the air introducing passage that is opened on an outer wall of the housing and the outlet portion of the air introducing passage is opened to an interior of the housing, and
a flow sectional area of the air introducing passage continuously decreases in a flowing direction of the outer air through the air introducing passage such that a flow sectional area of the inlet portion that is opened on the interior of the housing is greater than a flow sectional area of the outlet portion that is opened to an interior of the housing.

* * * * *